United States Patent
Yu et al.

(10) Patent No.: US 12,379,274 B2
(45) Date of Patent: Aug. 5, 2025

(54) TEST METHOD OF WHEEL SPEED SIMULATION AND ACQUISITION EQUIPMENT FOR EPB REAR WHEEL ANTI-LOCK BRAKE TEST

(71) Applicant: GLOBAL TECHNOLOGY CO., LTD., Nantong (CN)

(72) Inventors: Zixiang Yu, Nantong (CN); Lili Zhang, Nantong (CN); Zhanyu Yuan, Nantong (CN); Xiang Zhou, Nantong (CN); Zhaoyong Liu, Nantong (CN); Dingsen Zhou, Nantong (CN)

(73) Assignee: GLOBAL TECHNOLOGY CO., LTD., Nantong (CN)

( * ) Notice: Subject to any disclaimer, the term of this patent is extended or adjusted under 35 U.S.C. 154(b) by 451 days.

(21) Appl. No.: 17/927,371

(22) PCT Filed: Aug. 5, 2021

(86) PCT No.: PCT/CN2021/110835
§ 371 (c)(1),
(2) Date: Nov. 23, 2022

(87) PCT Pub. No.: WO2022/028526
PCT Pub. Date: Feb. 10, 2022

(65) Prior Publication Data
US 2023/0221201 A1    Jul. 13, 2023

(30) Foreign Application Priority Data

Aug. 7, 2020 (CN) .......................... 202010787660.4

(51) Int. Cl.
*G01L 5/28* (2006.01)
*G01M 17/013* (2006.01)

(52) U.S. Cl.
CPC ............. *G01L 5/28* (2013.01); *G01M 17/013* (2013.01)

(58) Field of Classification Search
None
See application file for complete search history.

(56) References Cited

U.S. PATENT DOCUMENTS

| 8,146,411 B2 | 4/2012 | Burgess et al. |
| 2012/0053798 A1 | 3/2012 | Hirota et al. |

FOREIGN PATENT DOCUMENTS

| CN | 101819094 A | 9/2010 |
| CN | 201732000 U | 2/2011 |

(Continued)

*Primary Examiner* — Matthew G Marini
(74) *Attorney, Agent, or Firm* — Bayramoglu Law Offices LLC

(57) ABSTRACT

A test method of wheel speed simulation and acquisition equipment for an EPB rear wheel anti-lock brake test is provided. The equipment includes a master computer, wheel simulation sets and an EPB system with a wheel anti-lock brake function, where the master computer includes a motor rotating speed control module, an EPB-required signal simulation module and a target wheel speed calculation module; the wheel simulation sets include motor drivers, motors, gears and wheel speed sensors; outputs of the wheel speed sensors are connected into the EPB system; the motor rotating speed control module is connected with the motor drivers; the EPB system to be tested includes EPB calipers, pressure sensors are arranged in the EPB calipers; the target wheel speed calculation module calculates a target wheel speed and sends the target wheel speed to the motor rotating speed control module to complete the control of an actual wheel speed.

7 Claims, 3 Drawing Sheets

(56) References Cited

FOREIGN PATENT DOCUMENTS

| | | |
|---|---|---|
| CN | 102589897 A | 7/2012 |
| CN | 203249776 U | 10/2013 |
| CN | 103576560 A | 2/2014 |
| CN | 205642848 U | 10/2016 |
| CN | 106094567 A | 11/2016 |
| CN | 205861354 U | 1/2017 |
| CN | 106605136 A | 4/2017 |
| CN | 206573299 U | 10/2017 |
| CN | 107677408 A | 2/2018 |
| CN | 107941524 A | 4/2018 |
| CN | 110411762 A | 11/2019 |
| CN | 209727988 U | 12/2019 |
| CN | 211042567 U | 7/2020 |
| CN | 111929072 A | 11/2020 |
| JP | 2018091709 A | 6/2018 |

TEST METHOD OF WHEEL SPEED SIMULATION AND ACQUISITION EQUIPMENT FOR EPB REAR WHEEL ANTI-LOCK BRAKE TEST

CROSS REFERENCE TO THE RELATED APPLICATIONS

This application is the national phase entry of International Application No. PCT/CN2021/110835, filed on Aug. 5, 2021, which is based upon and claims priority to Chinese Patent Application No. 202010787660.4, filed on Aug. 7, 2020, the entire contents of which are incorporated herein by reference.

TECHNICAL FIELD

The present invention relates to the technical field of vehicle test devices, and in particular to a test method of a wheel speed simulation and acquisition equipment for an EPB rear wheel anti-lock brake test.

BACKGROUND

In the automotive related research and development industry, wheel speed is an important parameter required for achieving various functions, especially in a brake system. Through the comprehensive determination of information such as wheel speed and vehicle speed, the system can execute corresponding functions only by knowing the state of the vehicle and the wheels. The anti-lock brake function of the EPB is mainly used for braking a motor vehicle. However, the efficiency of function testing is reduced by acquiring wheel speed information when a vehicle runs, and the acquisition of the wheel speed information in extreme cases is difficult or even dangerous, all of those problems bring great difficulty to the research and development of the anti-lock brake function of the EPB system in a relevant vehicle. Therefore, how to provide a stable, efficient and real-situation-approaching wheel speed simulation and acquisition device is an urgent problem to be solved.

SUMMARY

The purpose of the present invention is to provide a test method of wheel speed simulation and acquisition equipment for an EPB rear wheel anti-lock brake test, which can conveniently and efficiently test the anti-lock brake function of an EPB system of a vehicle.

The technical purpose of the present invention is realized by the following technical solution:

Provided is a test method of wheel speed simulation and acquisition equipment for an EPB rear wheel anti-lock brake test, where the equipment includes a master computer, a plurality of wheel simulation sets and an EPB system with a wheel anti-lock brake function, where the master computer includes a motor rotating speed control module, an EPB-required signal simulation module and a target wheel speed calculation module;

the wheel simulation set includes a motor driver, a motor, a gear and a wheel speed sensor, where the motor driver drives the motor to rotate, an output shaft of the motor drives the gear to rotate, and the wheel speed sensor senses a rotating speed of the gear; an output of the wheel speed sensor is connected into the EPB system;

the motor rotating speed control module is connected with the motor driver, and the motor driver controls a rotating speed of the motor by outputting a PWM wave with a set frequency;

the EPB system to be tested includes EPB calipers, and pressure sensors are arranged in the EPB calipers and feed clamping forces of the calipers back to the target wheel speed calculation module;

the EPB-required signal simulation module simulates various signals required by the EPB system with the wheel anti-lock brake function and sends the signals to the EPB system;

the target wheel speed calculation module calculates a target wheel speed by combining a simulation formula and simulation parameters generated by analyzing a vehicle test result with feedback information of the pressure sensors, and sends the target wheel speed to the motor rotating speed control module to complete the control of an actual wheel speed;

the test method includes the following steps:

S1, setting various parameters in the motor drivers through master computer software corresponding to the motor drivers, outputting, by the motor rotating speed control module, the PWM wave with the set frequency, and controlling, by the motor drivers, an initial rotating speed of the motors;

S2, driving, by the motors, the gears to rotate, and simulating an actual wheel rotating speed by combining the rotation of the gears with a set wheel radius;

S3, obtaining, by the wheel speed sensors, an simulated wheel rotating speed by acquiring the rotating speed of the gears and sending the simulated wheel rotating speed to the EPB system, after an switch of the EPB is pulled up, starting the simulation of a vehicle to carry out emergency braking by using the EPB system, and executing, by the EPB system, corresponding functions including clamping and releasing by combining other simulation signals sent by the master computer;

S4, acquiring, by the pressure sensors, pressures of the EPB calipers and sending a result to the target wheel speed calculation module;

S5, calculating, by the target wheel speed calculation module, the target wheel speed by combining acquired caliper pressure information with the simulation parameters, where the simulation parameters include a road adhesion coefficient and the wheel radius; and calculating, by the target wheel speed calculation module, a required motor rotating speed according to a corresponding relation between the wheel speed and the motor rotating speed, then calculating the frequency of the PWM wave required to be output by the master computer according to a relation between the motor rotating speed and the frequency of the PWM wave output by the master computer, and sending the frequency to the motor rotating speed control module;

where the target wheel speed calculation module realizes the calculation of the target wheel speed by setting a calculation formula, the simulation parameters, a current wheel speed and the clamping forces of the calipers; under ideal conditions and a condition that a braking force is only provided by the EPB calipers, the simulation formula for wheel speed calculation is as follows:

$$V_{wheel} = \frac{V_0}{1+s} - \int_0^t a_{minus} dt,$$

-continued
$$a_{minus} = \frac{F}{M} = \frac{2*T\mu}{M*R} = \frac{4*\mu*P*r}{M*R};$$

where $a_{minus}$ is a braking deceleration; F is a braking force; $V_0$ is a set initial speed; s is a slip ratio; μ is a friction coefficient of a brake disc; P is a pressure to which the brake disc is subjected; r is an acting radius of the brake disc, $r=(r_1+r_2)/2$, $r_1$ is an inner diameter of the brake disc, and $r_2$ is an outer diameter of the brake disc; M is a total mass of the vehicle; R is the wheel radius; and S6, outputting, by the motor rotating speed control module, the PWM wave obtained in S5 to the motor drivers to control the rotating speed of the motors, so as to achieve the wheel speed obtained by calculation, simulating a result of controlling the vehicle, executing, by the EPB system, corresponding functions according to an output result of the wheel speed sensors, circularly executing S4 to S6 until the execution of the EPB functions is completed, and reducing the wheel speed to "0".

Furthermore, the motor driver is a stepping servo motor driver, the motor is a servo stepping motor, and the motor is accurately controlled to move through control parameters input by the master computer.

Furthermore, the servo stepping motor has multiple pulse input modes, and the motor driver includes a DIP switch used for setting subdivision settings, input edges and directions of the motor.

Furthermore, four said wheel simulation sets are arranged, and four said motor drivers are independently controlled.

Furthermore, the EPB system is connected with the master computer software through a CAN card.

Furthermore, during simulation, a relation between the braking force generated by the calipers and a maximum braking force theoretically generated on the ground is taken as a determination condition for determining whether wheels are close to locking or not; the maximum braking force that can be theoretically generated on the ground is as follows:

$$F\ max=\varphi Mg,$$

where φ is a ground adhesion coefficient; g is a gravitational acceleration.

Furthermore, in the step S5, the calculation formula of the frequency of the required output PWM wave is as follows:

$$V_{wheel} = w_{gear} \times 2 \times \pi \times R,$$

$$w_{gear} = \frac{f*\theta}{360*m};$$

where R is the wheel radius; f is an input pulse frequency, θ is a motor stepping angle, m is a motor subdivision number; $w_{gear}$ is a frequency of the gear.

In conclusion, the present invention has the following beneficial effects:

The master computer controls the motors to drive the gears to rotate, the acquisition of the wheel speed of the vehicle in an actual situation is simulated by measuring the rotating speed of the gears through the sensors, the wheel speed signal is sent to the EPB system function module, the system executes the functions by comprehensively combining other signals simulated by the master computer and sends corresponding information to the master computer, and the master computer updates the control of the rotating speed of the motors, so that the test is safer, more stable, more efficient and close to the real situation.

In the figures, 1 is a housing; 2 is a motor; 21 is a connecting rod; 3 is a gear; 4 is a handle; 5 is a radiator; 6 is a through hole.

DETAILED DESCRIPTION OF THE EMBODIMENTS

The detailed description of the present invention is further illustrated below with reference to the accompanying drawings, to which, however, the present invention is not limited.

Figure 1:
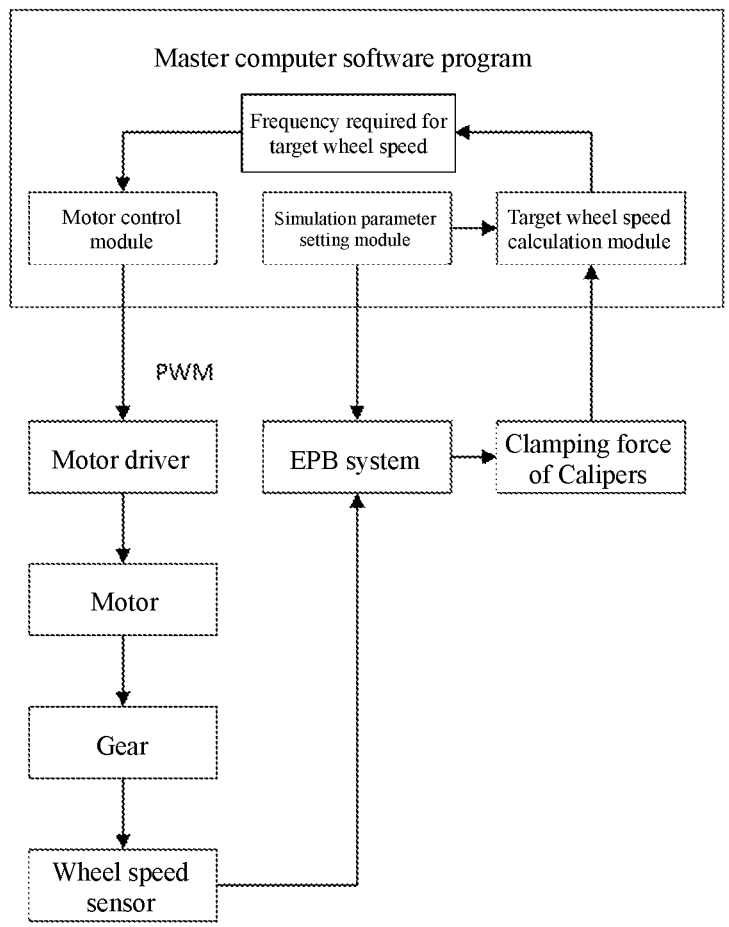
FIG. 1 is a schematic diagram of an overall structure of the present invention.
Figure 2:
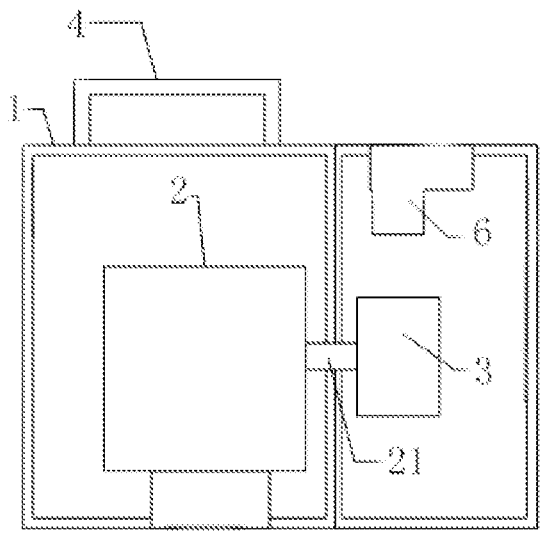
FIG. 2 is a schematic structural diagram of a wheel simulation set according to the present invention.

Provided is wheel speed simulation and acquisition equipment for an EPB rear wheel anti-lock brake test, as shown in FIG. 1, the equipment includes a master computer, four wheel simulation sets and an EPB system with a wheel anti-lock brake function, where the master computer includes a motor rotating speed control module, an EPB-required signal simulation module and a target wheel speed calculation module;

as shown in FIGS. 1 and 2, the wheel simulation set includes a motor driver, a motor 2, a gear 3 and a wheel speed sensor, where the motor driver is a stepping servo motor driver and includes a DIP switch used for setting subdivision settings, input edges and directions of the motor 2; the motor rotating speed control module is connected with the motor driver, the motor 2 is a servo stepping motor and has multiple pulse input modes, and the motor driver drives the motor 2 to rotate; the motor drivers are respectively and independently controlled by one motor driver, and the motor 2 is accurately controlled to move through control parameters input by the master computer.

As shown in FIG. 1, the motor driver controls a rotating speed of the motor by configuring parameters of the motor drivers and outputting a PWM wave with a set frequency, and the PWM wave is input to the motor drivers through a data acquisition card; an output shaft of the motor 2 is coaxially connected with the gear 3 through the connecting rod 21 and the gear 3 is driven to rotate, the wheel speed sensor senses the rotating speed of the gear 3, and a connecting part of the gear 3 and the connecting rod 21 is reinforced through screws and provides proper damping, so that the shaking phenomenon of the motor 2 is eliminated and the actual situation is better simulated; the motor drivers are also respectively connected with LED lamps and can provide a warning when the motor drivers have errors or faults.

As shown in FIG. 2, the motor drivers are mounted in the housing 1, the housing 1 is provided with two adjacent cavities, one cavity being provided with the motor drivers and the motors 2 through a bracket, the other cavity accommodating the gears 3, and four gears 3 are located in the same vertical plane parallel to the side surface of the housing 1.

As shown in FIG. 2, the housing 1 is a metal shell, and has a plurality of external interfaces, including a power interface and an enable switch, where the bottom of the housing 1 is stable, and two sides of the top of the housing are respectively provided with a handle 4. The power interface is used for connecting a power supply and converting the power supply into a required power supply through a power adapter to be supplied to the motor drivers; for an enable switch button, the power supply can be provided for the motor drivers to drive the motors 2 only by pressing the button after the power supply is connected; the housing 1 is also connected with a switch used for controlling the forward and reverse rotation of the motors 2.

Figure 3:
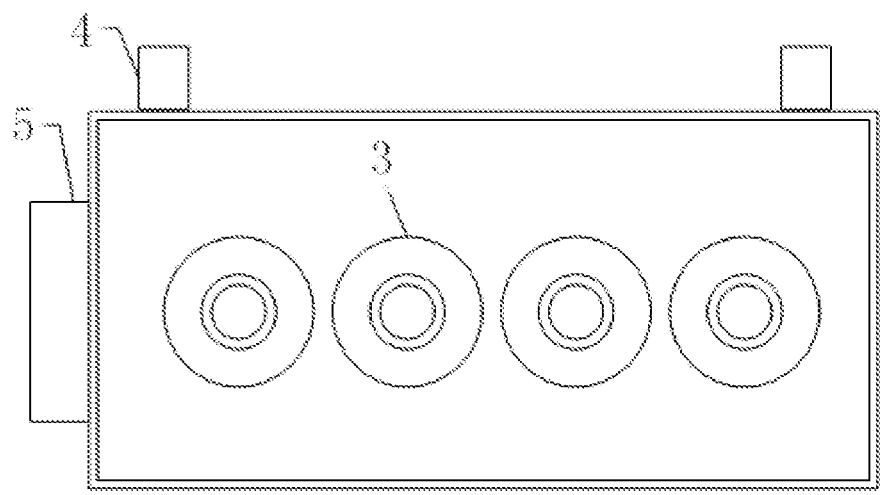
FIG. 3 is a side sectional view of FIG. 2.

As shown in FIG. 3, a radiator 5 is mounted on one side of the housing 1, and an air-vent is formed on the other side; the top of the housing 1 is provided with four through holes 6 used for connecting the wheel speed sensors, and the four through holes 6 are respectively over against the four gears 3; the through hole 6 includes an upper half part of a placing hole and a lower half part of a cylinder, the cross-sectional area of the upper half part is larger than that of the lower half part, its juncture has a platform, and screw holes are formed in the platform, which is convenience for the placement and fixing of the wheel speed sensors.

As shown in FIG. 3, the four wheel speed sensors are respectively mounted in the four through holes 6 in a vertical manner, the heads of the wheel speed sensors are downward and over against a rotating tangent plane above the gears 3 through the through holes 6, and the top plane of the wheel speed sensors is parallel to the rotating tangent plane above the gears 3; the depth of the lower half part of the through hole 6 is matched with the shortest size of a common probe of the wheel speed sensor, and the lower half part of the through hole is matched with more models of wheel speed sensors by using physical methods such as adding a gasket on a platform of the through hole 6.

As shown in FIG. 1, an output of the wheel speed sensor is connected into the EPB system; the EPB system to be tested includes EPB calipers, pressure sensors are arranged in the EPB calipers and feed clamping forces of the calipers back to the target wheel speed calculation module; the EPB system is connected with the master computer software through a CAN card.

As shown in FIG. 1, the EPB-required signal simulation module simulates various parameters, such as vehicle speed, ground adhesion coefficient and gradient, required for the EPB system with the wheel anti-lock brake function, and sends the parameters to the EPB system.

As shown in FIG. 1, the target wheel speed calculation module calculates a target wheel speed by combining a simulation formula and simulation parameters generated by analyzing a vehicle test result with feedback information of the pressure sensors, and sends the target wheel speed to the motor rotating speed control module to complete the control of an actual wheel speed.

Figure 4:
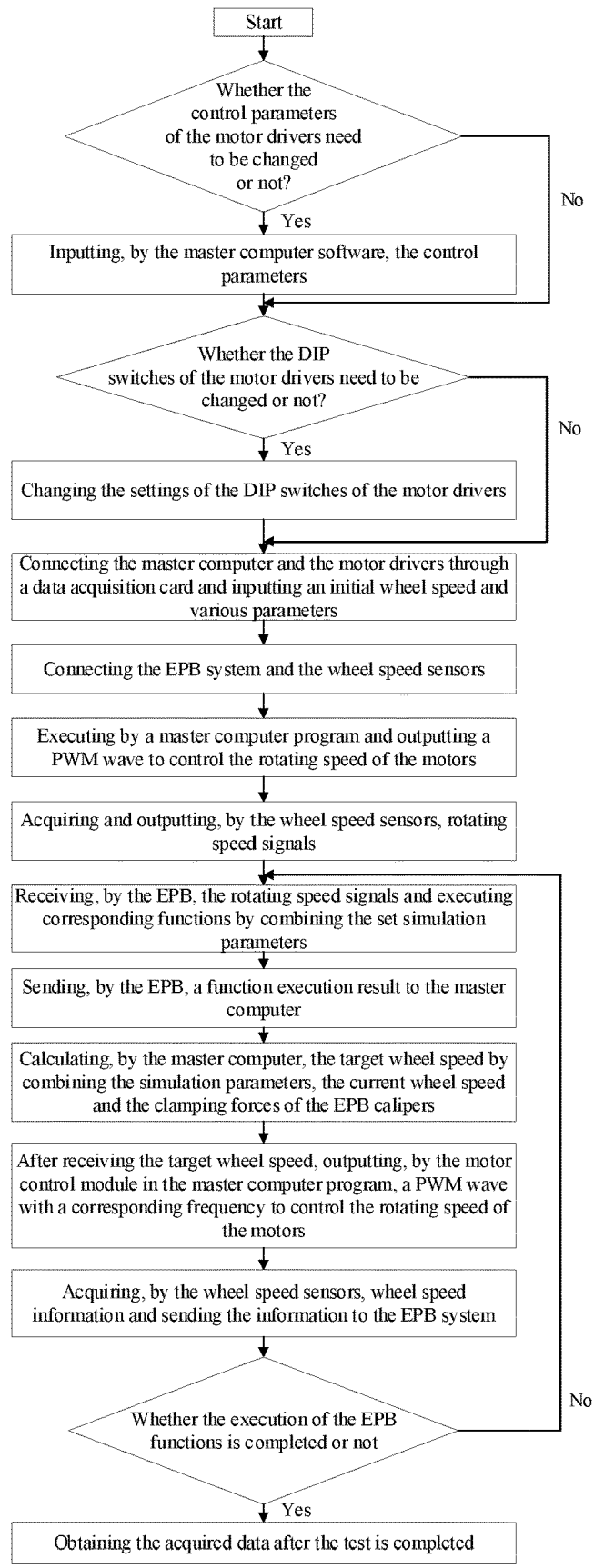
FIG. 4 is a flowchart of the simulation detection of the present invention.

As shown in FIG. 4, provided is a test method of wheel speed simulation and acquisition equipment for an EPB rear wheel anti-lock brake test, including the following steps:

S1, setting various parameters of the motor drivers in the motor drivers through the master computer, changing the settings of DIP switches of the motor drivers as required, then connecting the master computer and the motor drivers by using a data acquisition card, and inputting an initial wheel speed and various parameters; and outputting, by the motor rotating speed control module, the PWM wave with the set frequency, and controlling, by the motor drivers, the initial rotating speed of the motors;

S2, driving, by the motors, the gears to rotate, and simulating an actual wheel rotating speed by combining the rotation of the gears with a set wheel radius;

S3, obtaining, by the wheel speed sensors, an simulated wheel rotating speed by acquiring the rotating speed of the gears and sending the simulated wheel rotating speed to the EPB system, after an switch of the EPB is pulled up, starting the simulation of a vehicle to carry out emergency braking by using the EPB system, and executing, by the EPB system, corresponding functions including clamping and releasing by combining other simulation signals sent by the master computer, where how the EPB system herein acts is determined by the system to be tested;

S4, acquiring, by the pressure sensors, pressures of the EPB calipers and sending a result to the target wheel speed calculation module;

S5, realizing, by the target wheel speed calculation module, the calculation of the target wheel speed by setting a calculation formula, the simulation parameters, a current wheel speed and the clamping forces of the calipers, where the simulation parameters required to be set herein include an initial speed $V_0$, a brake friction coefficient, a wheel radius R, a brake disc acting radius r, a total mass M of the vehicle, a slip ratio s and a ground adhesion coefficient $\varphi$.

under ideal conditions and a condition that a braking force is only provided by the EPB calipers, the simulation formula for wheel speed calculation is as follows:

$$V_{wheel} = \frac{V_0}{1+s} - \int_0^t a_{minus} dt,$$

$$a_{minus} = \frac{F}{M} = \frac{2*T\mu}{M*R} = \frac{4*\mu*P*r}{M*R};$$

where $a_{minus}$ is a braking deceleration; F is a braking force; $V_0$ is a set initial speed; s is a slip ratio; μ is a friction coefficient of a brake disc; P is a pressure to which the brake disc is subjected; r is an acting radius of the brake disc, $r=(r_1+r_2)/2$, $r_1$ is an inner diameter of the brake disc, and $r_2$ is an outer diameter of the brake disc; M is a total mass of the vehicle; R is the wheel radius; and the target wheel speed calculation module calculates a required motor rotating speed according to a corresponding relation between the wheel speed and the motor rotating speed, and then the frequency of the PWM wave required to be output by the master computer is calculated according to a relation between the motor rotating speed and the frequency of the PWM wave output by the master computer and sent to the motor rotating speed control module;

the calculation formula of the frequency of the required output PWM wave is as follows:

$$V_{wheel} = w_{gear} \times 2 \times \pi \times R,$$

$$w_{gear} = \frac{f*\theta}{360*m};$$

where R is the wheel radius; f is an input pulse frequency, θ is a motor stepping angle, m is a motor subdivision number; $w_{gear}$ is a frequency of the gear;

during simulation, a relation between the braking force generated by the calipers and a maximum braking force theoretically generated on the ground is taken as a determination condition for determining whether wheels are close to locking or not, under the condition that the wheels are close to locking, the braking pressure of a corresponding wheel is released and kept constant when the wheel is required or measured to accelerate again, and the braking pressure is gradually increased after the wheel is accelerated again, so that an anti-lock brake function is realized for testing; the maximum braking force that can be theoretically generated on the ground is as follows:

$$F\ max=\varphi Mg,$$

where $\varphi$ is a ground adhesion coefficient; g is a gravitational acceleration; and S6, outputting, by the motor rotating speed control module, the PWM wave obtained in S5 to the motor drivers to control the rotating speed of the motors, so as to achieve the wheel speed obtained by calculation, simulating a result of controlling the vehicle, executing, by the EPB system, corresponding functions according to an output result of the wheel speed sensors, circularly executing S4 to S6 until the execution of the EPB functions is completed, and reducing the wheel speed to "0".

In conclusion, the master computer software controls the motors to drive the gears to rotate, the acquisition of the wheel speed of the vehicle in an actual situation is simulated by measuring the rotating speed of the gears through the sensors, the wheel speed signal is sent to the EPB system function module, the system executes the functions by comprehensively combining other signals simulated by the master computer and sends corresponding information to the master computer, and the master computer updates the control of the rotating speed of the motors, so that the simulation and the acquisition on the wheel speed during the EPB test are realized.

The above mentioned contents are only preferred embodiments of the present invention and are not intended to limit the present invention. Various modifications or equivalent substitutions made by those skilled in the art within the spirit and protection scope of the present invention shall fall within the protection scope of the technical solution of the present invention.

What is claimed is:

1. A test method of a wheel speed simulation and an acquisition equipment for an EPB rear wheel anti-lock brake test, wherein, the equipment comprises a master computer, a plurality of wheel simulation sets and an EPB system with a wheel anti-lock brake function, wherein the master computer comprises a motor rotating speed control module, an EPB-required signal simulation module and a target wheel speed calculation module;

each of the plurality of wheel simulation sets comprises a motor driver, a motor, a gear and a wheel speed sensor, wherein the motor driver drives the motor to rotate, an output shaft of the motor drives the gear to rotate, and the wheel speed sensor senses a rotating speed of the gear; an output of the wheel speed sensor is connected into the EPB system;

the motor rotating speed control module is connected with the motor driver, and the motor driver controls a rotating speed of the motor by outputting a PWM wave with a set frequency;

the EPB system to be tested comprises EPB calipers, and pressure sensors are arranged in the EPB calipers and the pressure sensors feed clamping forces of the calipers back to the target wheel speed calculation module;

the EPB-required signal simulation module simulates various signals required by the EPB system with the wheel anti-lock brake function and sends the signals to the EPB system;

the target wheel speed calculation module calculates a target wheel speed by combining a simulation formula and simulation parameters with feedback information of the pressure sensors, and the target wheel speed calculation module sends the target wheel speed to the motor rotating speed control module to complete a control of an actual wheel speed, wherein the simulation formula and the simulation parameters are generated by analyzing a vehicle test result;

the test method comprises the following steps:

S1, setting various parameters in the motor drivers through a master computer software corresponding to the motor drivers, outputting, by the motor rotating speed control module, the PWM wave with the set frequency, and controlling, by the motor drivers, an initial rotating speed of the motors;

S2, driving, by the motors, the gears to rotate, and simulating an actual wheel rotating speed by combining a rotation of the gears with a set wheel radius;

S3, obtaining, by the wheel speed sensors, an simulated wheel rotating speed by acquiring the rotating speed of the gears and sending the simulated wheel rotating speed to the EPB system, after an switch of the EPB system is pulled up, starting a simulation of a vehicle to carry out emergency braking by using the EPB system, and executing, by the EPB system, functions including clamping and releasing by combining other simulation signals sent by the master computer;

S4, acquiring, by the pressure sensors, pressures of the EPB calipers and sending a result to the target wheel speed calculation module;

S5, calculating, by the target wheel speed calculation module, the target wheel speed by combining acquired caliper pressure information with the simulation parameters, wherein the simulation parameters comprise a road adhesion coefficient and the wheel radius; and calculating, by the target wheel speed calculation module, a required motor rotating speed according to a relation between the wheel speed and the motor rotating speed, calculating the frequency of the PWM wave required to be output by the master computer according to a relation between the motor rotating speed and the frequency of the PWM wave output by the master computer, and sending the frequency to the motor rotating speed control module;

wherein the target wheel speed calculation module realizes a calculation of the target wheel speed by setting a calculation formula, the simulation parameters, a current wheel speed and the clamping forces of the calipers; under ideal conditions and a condition that a braking force is only provided by the EPB calipers, the simulation formula for a wheel speed calculation is as follows:

$$V_{wheel} = \frac{V_0}{1+s} - \int_0^t a_{minus} dt,$$

-continued
$$a_{minus} = \frac{F}{M} = \frac{4*\mu*P*r}{M*R};$$

wherein $a_{minus}$ is a braking deceleration; F is a braking force; $V_0$ is a set initial speed; s is a slip ratio; μ is a friction coefficient of a brake disc; P is a pressure, wherein the brake disc is subjected to the pressure; r is an acting radius of the brake disc, $r=(r_1+r_2)/2$, $r_1$ is an inner diameter of the brake disc, and $r_2$ is an outer diameter of the brake disc; M is a total mass of the vehicle; R is the wheel radius; and S6, outputting, by the motor rotating speed control module, the PWM wave obtained in S5 to the motor drivers to control the rotating speed of the motors to achieve the wheel speed obtained by the calculation, simulating a result of controlling the vehicle, executing, by the EPB system, functions according to an output result of the wheel speed sensors, circularly executing S4 to S6 until the execution of the EPB functions is completed, and reducing the wheel speed to "0".

2. The test method according to claim 1, wherein the motor driver is a stepping servo motor driver, the motor is a servo stepping motor, and the motor is accurately controlled to move through control parameters input by the master computer.

3. The test method according to claim 2, wherein the servo stepping motor has multiple pulse input modes, and the motor driver comprises a DIP switch used for setting subdivision settings, input edges and directions of the motor.

4. The test method according to claim 1, wherein four wheel simulation sets are arranged, and four said motor drivers are independently controlled.

5. The test method according to claim 1, wherein the EPB system is connected with the master computer software through a CAN card.

6. The test method according to claim 1, wherein during simulation, a relation between the braking force and a maximum braking force is taken as a determination condition for determining whether wheels are close to locking or not, wherein the braking force is generated by the calipers and the maximum braking force is theoretically generated on the ground; the maximum braking force is as follows:

$F\max=\varphi Mg$, wherein φ is a ground adhesion coefficient; g is a gravitational acceleration.

7. The test method according to claim 1, wherein in step S5, the calculation formula of the frequency of the required output PWM wave is as follows:

$$V_{wheel} = w_{gear} \times 2 \times \pi \times R,$$

$$w_{gear} = \frac{f*\theta}{360*m};$$

wherein R is the wheel radius; f is an input pulse frequency, θ is a motor stepping angle, m is a motor subdivision number; $w_{gear}$ is a frequency of the gear.

* * * * *